United States Patent Office 2,789,602
Patented Apr. 23, 1957

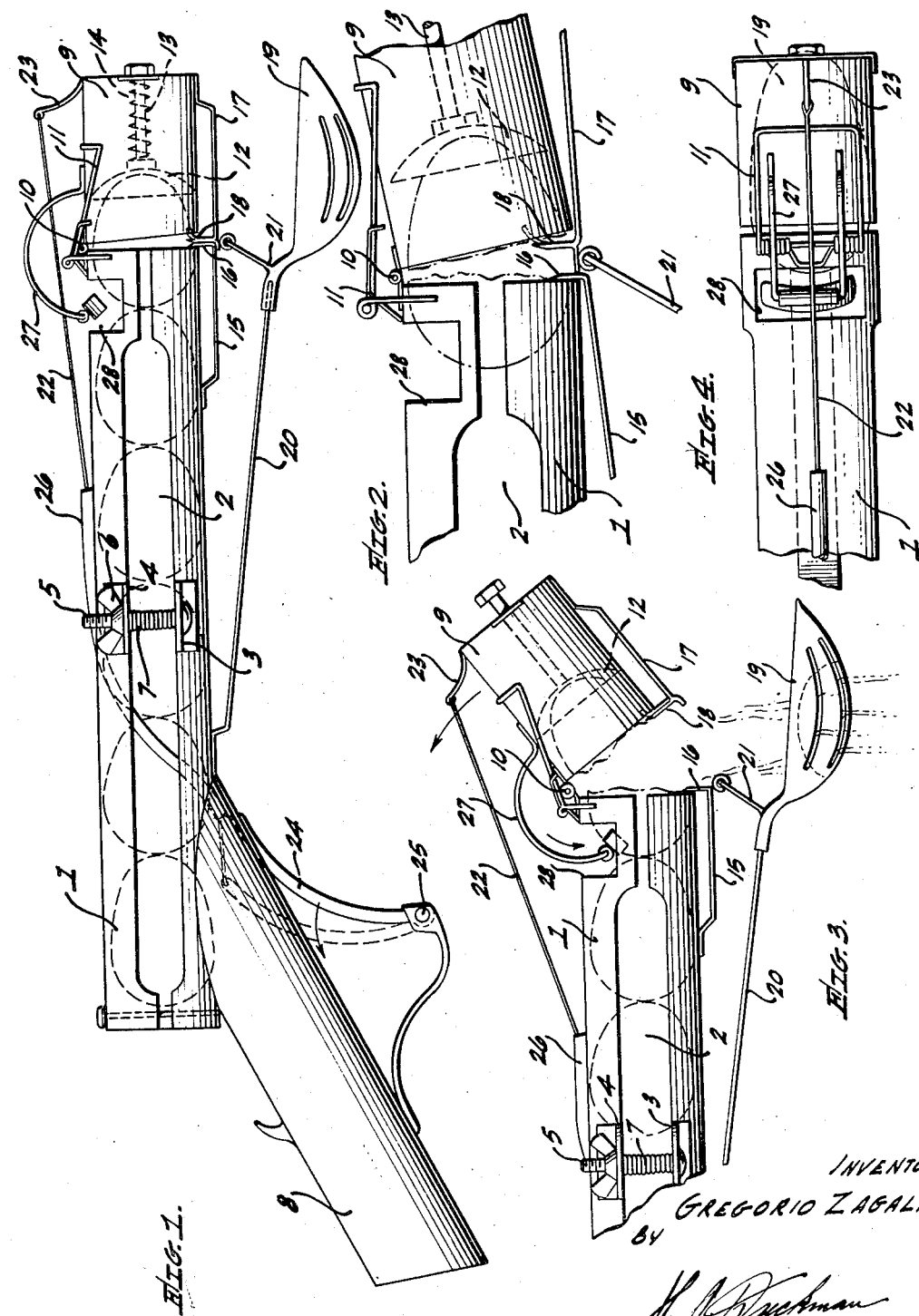

2,789,602

EGGSHELL BREAKER AND SEPARATOR

Gregorio Zagala, Lomita, Calif.

Application January 6, 1955, Serial No. 480,140

7 Claims. (Cl. 146—2)

This invention relates to an eggshell breaker and separator whereby one or more eggs may be quickly and easily cracked, the shell then parted and the egg yolk and white separated, all of this without having to manipulate in any way other than to insert the eggs in the separator.

An object of my invention is to provide a novel eggshell breaker and separator wherein a plurality of eggs may be positioned within a tubular container, the eggs being successively positioned so that the shell can be broken and the yolk and white of the egg then separated in an easy and expeditious manner.

Another object of my invention is to provide a novel eggshell breaker and separator in which a substantial number of eggs may be positioned in the tubular container of the separator, the eggs automatically moving towards the outer end of the tube and are automatically positioned so that the shell may be broken at the center of the egg and the shell then parted, so that the white and yolk of the egg will flow downwardly into a receptacle.

Still another object of my invention is to provide a novel eggshell breaker and separator in which the eggshells may be easily and quickly disposed of after the shell has been broken, and the yolk and white of the egg removed therefrom; the shells being disposed of without having to pick the shells from the separator the shells dropping out of the end of the tubular container when the cap portion is raised.

Other objects, advantages and features of invention may appear from the accompanying drawing, the subjoined detailed description and the appended claims.

In the drawing:

Figure 1 is a side elevation of my eggshell breaker and separator.

Figure 2 is a fragmentary side elevation showing the cap slightly raised to part the eggshell after it has been cracked.

Figure 3 is a fragmentary side elevation of my eggshell breaker and separator showing the shell about to be ejected from the separator.

Figure 4 is a fragmentary plan view of the forward portion of my eggshell breaker and separator.

Referring more particularly to the drawing, the numeral 1 indicates a cylindrical housing which is open at both ends, and which is provided with longitudinal slots or openings 2 to permit expansion or contraction of the housing to accommodate eggs of different sizes. A pair of lugs 3 and 4 are each formed on the housing 1 and are positioned on the bottom and top, respectively, of the opening 2. A bolt 5 extends through these lugs and a wing nut 6 is threaded onto the bolt for the purpose of drawing the lugs 3—4 together, thereby decreasing the diameter of the tubular housing 1. A spring 7 surrounds the bolt 5 and bears against the lugs 3—4, thus tending to separate these lugs and enlarge the diameter of the housing 1 when the wing nut 6 is unthreaded. A handle 8 projects downwardly from the housing 1 so that the operator may readily manipulate the egg breaker and separator. A cap 9, tubular in form, is pivotally mounted as shown at 10, to the outer end of the housing 1. The pivot 10 is at the top of the housing 1 so that the cap 9 will tilt upwardly, as shown in Figures 2 and 3. A spring 11 bears against the cap 9 and tends to urge the cap to a position in alignment with the housing 1, as shown in Figure 1.

A piston 12 is slidably mounted in the cap 9 on the pin 13, and a light coil spring 14 bears against the piston 12 to press this piston towards the inner end of the cap 9 and to maintain a slight spring tension against half of the eggshell, as will be further described. A spring 15 is fixedly mounted on the bottom of the housing 1 and is bent upwardly at its outer end to form the blade 16 which projects into the space between the outer end of the housing 1 and the inner end of the cap 9. This space is always maintained, due to the fact that this blade 16 projects over the outer end of the housing 1. A similar spring 17 is mounted on the cap 9 and this spring also is formed with an upwardly projecting blade 18 which also is positioned between the outer end of the housing 1 and the inner end of the cap 9. The blades 16—18 serve to crack the eggshell, the egg being positioned as shown in Figure 1, that is, the egg bears against the piston 12 and the weight of the eggs behind it will slightly compress the spring 14 and, therefore, the egg will approximately center itself over the blades 16—18. The blades 16—18 are forced upwardly to crack the eggshell in the following manner:

A spoon 19 is mounted on the outer end of a spring handle 20. The spoon is slotted or perforated so that the egg white can flow through these openings, while the egg yolk is retained. A finger 21 projects upwardly from the spoon 19 and bears against the adjacent ends of the springs 15 and 17. Thus by pressing upwardly on the handle 20, or by striking the spoon 19 against a stationary object the blades 16—18 will be drawn upwardly to crack the eggshell. The spoon 19 is preferably detachably mounted on the spring handle 20 so that spoons of different sizes or shape may be used as necessary.

The eggshell being now broken it is necessary to separate the halves of the shell so that the egg whites, as well as the yolks, can flow downwardly into the spoon 19. The whites flow through the openings in the spoon while the yolks are retained in the spoon. Thus the eggs contents are separated. To separate the halves of the eggshell the following structure is provided: The outer end of a wire 22 is secured at its outer end to a pin 23, which rises from the cap 9. The other end of the wire 22 is attached to a trigger 24 which is pivotally mounted on the handle 8, as shown at 25. The wire 22 may extend through a flexible guide 26 which is secured to the housing 1, if desired. By pulling the trigger 24 the cap 9 will be swung upwardly, first a slight amount as shown in Figure 2, thereby separating the two halves of the eggshell and permitting the contents to flow downwardly into the spoon 19. Further pressure on the trigger 24 will swing the cap 9 to the position shown in Figure 3, at which point the eggshell is ejected. The ejection occurs due to the finger 27 which is secured to the top of the cap 9. The rear end of the finger 27 is adapted to pass through an opening 28 in the top of the housing 1. The finger 27 thus engages the rear half of the broken eggshell causing the shell to be pushed outwardly and drop out of the end of the housing 1. The slight tension of the spring 14 will cause the other half of the shell to drop out of the cap 9. The blades 16 and 18 projecting upwardly between the broken halves of the eggshell will cause the eggshell to be retained in their respective positions, until the cap 9 is swung upwardly a substantial amount to cause the finger 27 to eject half of the eggshell, and at this time the cap 9 will be practically vertical so that the other half of the eggshell will readily drop out of this cap.

*In operation.*—The housing 1 is filled with a number of eggs placed end to end, with the outermost egg projecting into the cap 9 and slightly compressing the spring 14. The spoon 19 is now struck against a table, or the like, or the handle 20 is pulled upwardly causing the finger 21 to press the blades 16 and 18 into and through the eggshell. The shell is not cracked, and by pressing the trigger 24 the cap 9 will be slightly elevated sufficiently to slightly separate the halves of the broken eggshell. The contents of the egg now pours downwardly into the spoon 19 where separation of the yolk and white of the egg occurs. Further pressure on the trigger 24 will now tilt the cap 9 upwardly so that the finger 27 bears against the rear half of the broken eggshell, causing the shell to be ejected. At the same time the other half of the broken eggshell will drop out of the cap 9, due to the practically vertical position of this cap. The spring 11 then returns the cap to a position in alignment with the housing 1. The next egg then slides outwardly to the position partly within the cap 9 and is now again in a position to be broken and its contents extracted.

Having described my invention, I claim:

1. An eggshell breaker and separator comprising a tubular housing open at both ends and adapted to contain eggs therein, a cap, means pivotally mounting the cap on one end of the housing, said cap being in alignment with the housing in one position thereof, a blade on the housing projecting over the end of the housing adjacent the cap, a second blade on the cap, projecting over the end of the cap adjacent the housing, a spoon, means mounting the spoon on the housing and located below the outer end of the housing, and means on the spoon engageable with said blades to press said blades into an eggshell.

2. An eggshell breaker and separator comprising a tubular housing open at both ends and adapted to contain eggs therein, a cap, means pivotally mounting the cap on one end of the housing, said cap being in alignment with the housing in one position thereof, a blade on the housing projecting over the end of the housing adjacent the cap, a second blade on the cap, projecting over the end of the cap adjacent the housing, a spoon, means mounting the spoon on the housing and located below the outer end of the housing, and means on the spoon engageable with said blades to press said blades into an eggshell, and manually actuated means to swing said cap on its pivot.

3. An eggshell breaker and separator comprising a tubular housing open at both ends and adapted to contain eggs therein, a cap, means pivotally mounting the cap on one end of the housing, said cap being in alignment with the housing in one position thereof, a blade on the housing projecting over the end of the housing adjacent the cap, a second blade on the cap, projecting over the end of the cap adjacent the housing, a spoon, means mounting the spoon on the housing and located below the outer end of the housing, and means on the spoon engageable with said blades to press said blades into an eggshell, and manually actuated means to swing said cap on its pivot, a finger on the cap, the housing having an opening therein through which said finger moves to eject an eggshell.

4. An eggshell breaker and separator comprising a tubular housing open at both ends and adapted to contain eggs therein, a cap, means pivotally mounting the cap on one end of the housing, said cap being in alignment with the housing in one position thereof, a piston in the cap, spring means bearing against the piston and urging said piston towards the end of the cap adjacent the housing, a spring mounted on the bottom of the housing, a blade on the end of the spring, said blade projecting over the end of the housing adjacent the cap, a second spring mounted on the cap, a second blade on the second spring, the second blade projecting over the end of the cap adjacent the housing, a spoon, means mounting the spoon on the housing and located below the outer end of the housing, and means on the spoon engageable with said springs to press the blades on the springs into an eggshell.

5. An eggshell breaker and separator comprising a tubular housing open at both ends and adapted to contain eggs therein, a cap, means pivotally mounting the cap on one end of the housing, said cap being in alignment with the housing in one position thereof, a piston in the cap, spring means bearing against the piston and urging said piston towards the end of the cap adjacent the housing, a spring mounted on the bottom of the housing, a blade on the end of the spring, said blade projecting over the end of the housing adjacent the cap, a second spring mounted on the cap, a second blade on the second spring, the second blade projecting over the end of the cap adjacent the housing, a spoon, a spring handle on the spoon mounted on the housing, said spoon being located below the outer end of the housing, and means on the spoon engageable with each of said springs to press the blades thereon into an eggshell.

6. An eggshell breaker and separator comprising a tubular housing open at both ends and adapted to contain eggs therein, a cap, means pivotally mounting the cap on one end of the housing, said cap being in alignment with the housing in one position thereof, a piston in the cap, spring means bearing against the piston and urging said piston towards the end of the cap adjacent the housing, a spring mounted on the bottom of the housing, a blade on the end of the spring, said blade projecting over the end of the housing adjacent the cap, a second spring mounted on the cap, a second blade on the second spring, the second blade projecting over the end of the cap adjacent the housing, a spoon, a spring handle on the spoon mounted on the housing, said spoon being located below the outer end of the housing, and means on the spoon engageable with each of said springs to press the blades thereon into an eggshell, and manually actuated means to swing said cap on its pivot.

7. An eggshell breaker and separator comprising a tubular housing open at both ends and adapted to contain eggs therein, a cap, means pivotally mounting the cap on one end of the housing, said cap being in alignment with the housing in one position thereof, a piston in the cap, spring means bearing against the piston and urging said piston towards the end of the cap adjacent the housing, a spring mounted on the bottom of the housing, a blade on the end of the spring, said blade projecting over the end of the housing adjacent the cap, a second spring mounted on the cap, a second blade on the second spring, the second blade projecting over the end of the cap adjacent the housing, a spoon, a spring handle in the spoon mounted on the housing, said spoon being located below the outer end of the housing, and means on the spoon engageable with each of said springs to press the blades thereon into an eggshell, and manually actuated means to swing said cap on its pivot, a finger on the cap, the housing having an opening therein through which said finger moves to eject an eggshell.

References Cited in the file of this patent

UNITED STATES PATENTS

| 782,039 | Merrifield et al. | Feb. 7, 1905 |
| 1,102,780 | Mezei et al. | July 7, 1914 |